Figure 1:
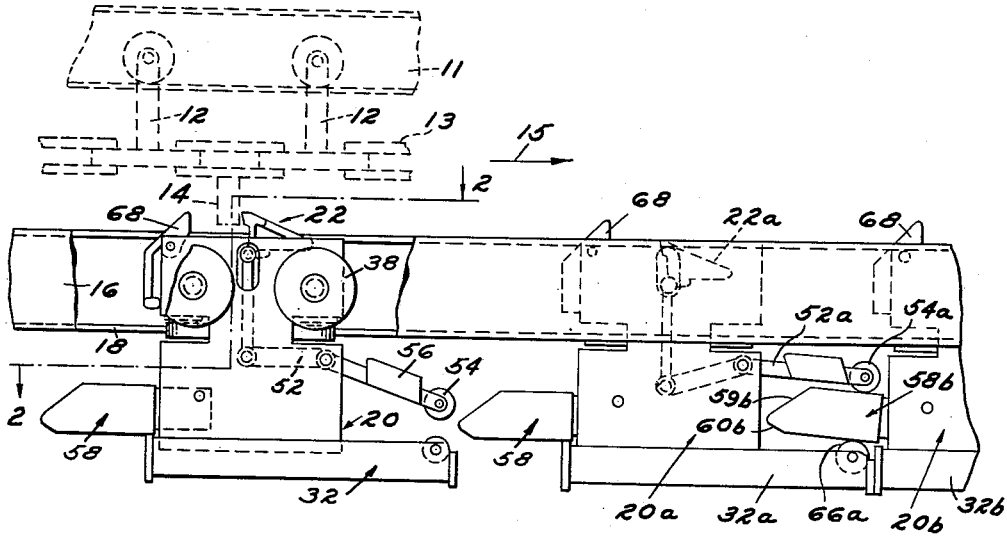

July 17, 1962  S. REIBEL ETAL  3,044,416
CONVEYOR TROLLEY WITH RELEASABLE DRIVING DOG
Original Filed Oct. 20, 1958  3 Sheets-Sheet 1

INVENTORS
SIDNEY REIBEL
ROBERT LYNN PURDON
BY MARTIN PACHUTA
Farley Forster & Farley
ATTORNEYS July 17, 1962  S. REIBEL ETAL  3,044,416
CONVEYOR TROLLEY WITH RELEASABLE DRIVING DOG
Original Filed Oct. 20, 1958  3 Sheets-Sheet 2
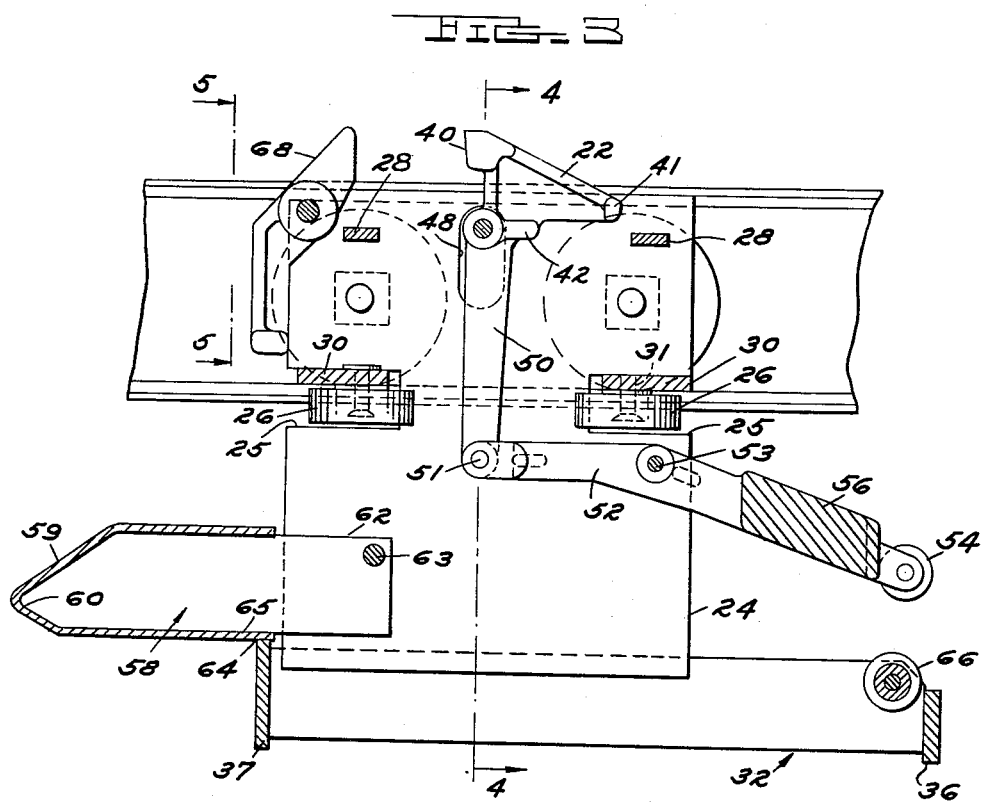
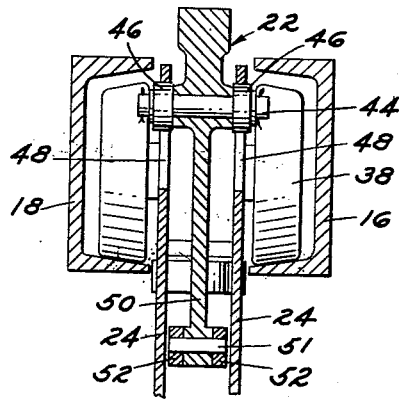
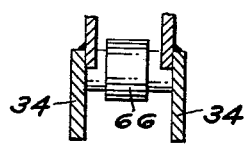
INVENTORS
SIDNEY REIBEL
ROBERT LYNN PURDON
MARTIN PACHUTA
BY Farley Forster & Farley
ATTORNEYS

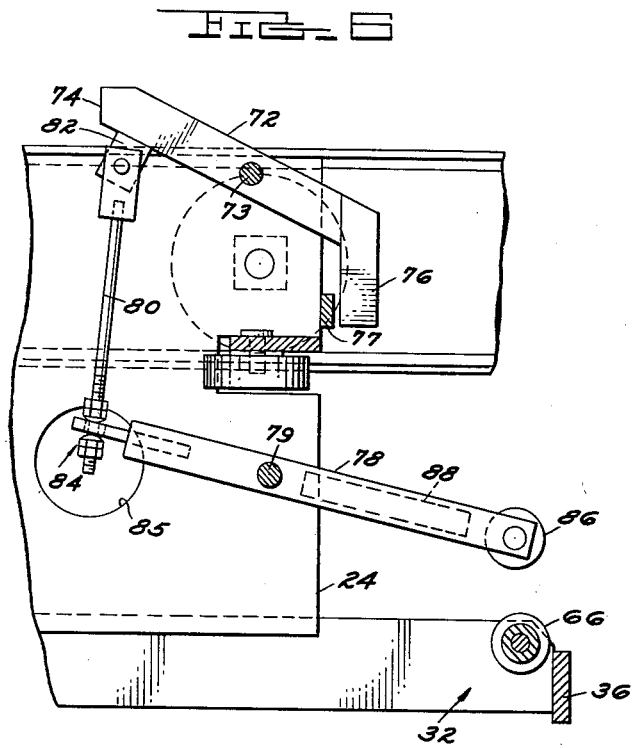

United States Patent Office 3,044,416
Patented July 17, 1962

3,044,416
CONVEYOR TROLLEY WITH RELEASABLE DRIVING DOG
Sidney Reibel, Farmington, Robert Lynn Purdon, Detroit, and Martin Pachuta, Allen Park, Mich., assignors to Jarvis B. Webb Company, Detroit, Mich., a corporation of Michigan
Continuation of abandoned application Ser. No. 768,176, Oct. 20, 1958. This application Dec. 12, 1961, Ser. No. 165,981
19 Claims. (Cl. 104—172)

This invention relates to an improved construction for a load carrying trolley of a conveyor installation of the type where such load carrying trolleys, each having a driving dog, are propelled along a supporting track by driving engagement with pusher members of a drive line.

The present application is a continuation of our co-pending application Serial No. 768,176 filed October 20, 1958, now abandoned, and incorporates the subject matter thereof.

Conveyor installations of this type are frequently referred to as "power and free," the term "power" signifying the fact that a separate drive line is employed to propel the load carrying trolleys which are otherwise free to move along their own supporting track. The present invention in general provides a means by which movement of any load carrying trolley can be interrupted by disengaging its driving dog from the pusher member of the drive line and a means by which a following trolley will be brought to a stop by having its driving dog similarly moved to a non-driving position as the following trolley approaches a stopped preceding trolley.

A number of advantages can be obtained in a power and free conveyor installation from such a mode of operation of the load carrying trolleys. For example, a work station can be established at any point along the drive line where trolleys can be stopped and an operation performed. Also, load carrying trolleys can be accumulated in a bank anywhere along the drive line and released from the bank as required.

The improved construction generally comprises, in a load carrying trolley having a driving dog as mentioned above, a means for mounting the driving dog on the body of the trolley for movement between driving and non-driving positions. Actuating means are connected to the driving dog and these means include a member movably carried on the trolley body and having a portion which projects from the forward end of the trolley body, that is, in the direction of travel of the trolley. Operating means are also carried by the trolley body and project from the rearward end thereof, or oppositely to the actuating means. The operating means of a leading stopped trolley are engageable by the actuating member of a following overtaking trolley and the driving dog of such following trolley is moved to and held in a non-driving position in response to contact between its actuating member and the operating means of the leading stopped trolley.

Preferably the load carrying trolley is also equipped with bumper means secured to the trolley body and projecting from the forward end thereof for engagement with a preceding trolley, these bumper means being arranged to prevent contact between the actuating member of a following trolley and the body of the leading stopped trolley.

Another preferred feature of the construction is that the operating means which projects from the rearward end of a trolley is movably carried by the trolley body and is adapted to be engaged by the bumper means of a following trolley to establish a certain relative position between the operating means and the following trolley's actuating member, thereby compensating for any vertical misalignment between adjacent trolleys and insuring movement of the following trolley driving dog to a non-driving position.

Figure 2:
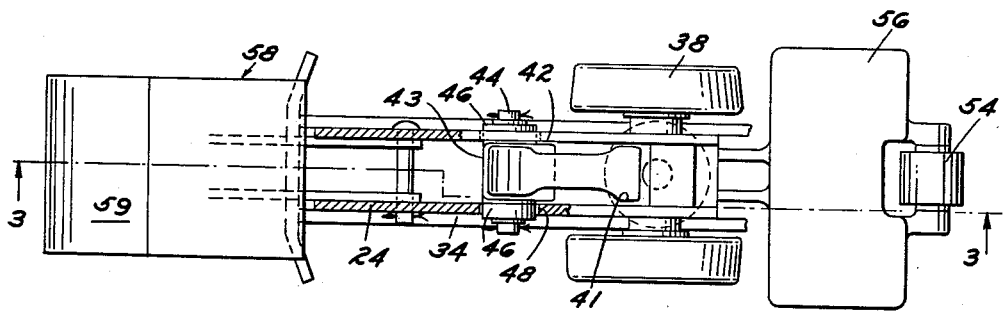

Other preferred features and advantages of the construction will be discussed in the following description of the presently preferred embodiments of the invention shown in the accompanying drawings which comprise the following views:

FIGURE 1, a side elevation showing a series of load carrying trolleys on their supporting track with a drive line being schematically shown in phantom;

FIGURE 2, an enlarged sectional plan view of a load carrying trolley taken on the line 2—2 of FIGURE 1 with the trolley supporting track not shown for the sake of clarity;

FIGURE 3, a sectional elevation of a load carrying trolley taken on the line 3—3 of FIGURE 2;

FIGURE 4, a sectional end elevation taken on the line 4—4 of FIGURE 3;

FIGURE 5, a partial end elevation taken as indicated by the arrows 5—5 of FIGURE 3; and FIGURE 6, a fragmentary sectional elevation corresponding to FIGURE 3 but showing an alternate construction and mounting of the trolley driving dog and means for actuating it.

The general setting of the invention is best illustrated in FIGURE 1 which shows a drive line track 11 for trolleys 12 which are connected by a drive chain 13. Pusher members 14 project downwardly from the chain at spaced intervals, and travel is in the direction of the arrow 15. Mounted below the drive line are a pair of facing channel track members 16 and 18 which form a supporting track for the load carrying trolleys 20, 20a and 20b. Each load carrying trolley is provided with a drive dog 22 which in normal or driving position is engageable by a pusher member 14 of the drive line as shown.

Each of the load carrying trolleys 20 has a body portion formed by a pair of parallel plates 24 (FIGS. 2 and 4) provided with notches 25 for receiving a pair of guide rollers 26. Plates 24 are connected at the upper portion of the trolley body by transverse members 28 (FIG. 3); are connected across the upper portion of the notches 25 by plates 30, each of which also serves as a mounting for an axle pin 31 for each of the guide rollers 26; and are connected at their lower ends to a bumper assembly 32. Bumper assembly 32 also consists of a pair of plates 34 (FIG. 4) which project beyond the ends of the trolley body and are interconnected at their forward ends by a transverse member 36 and at their rearward ends by a transverse member 37.

Each of the four trolley wheels 38 are supported on a stub axle which projects through and outwardly of a body plate 24.

The driving dog 22 has a driving face 40 which is slightly narrower than the transverse dimension between the body plates 24, and correspondingly dimensioned guide surfaces 41 and 42. Guide surface 42 extends from a boss portion 43 (FIG. 2). A pin 44 is mounted in the boss portion and carries a pair of guide rollers 46 on either side of the boss portion (FIG. 2). These guide rollers each engage a slotted guideway 48 formed in one of the body plates 24. Guideways 48 extend in the general direction of drive dog movement between driving and non-driving positions and the length of these guideways defines the extent of such movement.

Actuating means for moving the drive dog between driving and non-driving positions include an arm 50 integrally formed with the drive dog and pivotally connected at 51 to one end of an actuating member 52 which is mounted on a pivot pin 53 carried between the body plates 24. The other end of the actuating member 52 projects beyond the forward end of the trolley body and includes a roller contact element 54. Actuating member 52 also includes a counterweight portion 56 which provides a means for normally urging the drive dog and actuating means to a normal or driving position.

Operating means 58 are mounted on the body of each trolley and project from the rearward end thereof for engagement by the actuating member of a following trolley. This operating means consists of a plate having a first surface 59 inclined upwardly and inwardly and a second surface 60 extending downwardly and inwardly with the plate being attached to a pair of supporting brackets 62 pivotally connected between the body plates 24 by a pin 63. The normal position of this operating assembly is defined by contact between the upper surface 64 of the transverse bumper member 37 and the surface portion 65 of the operating assembly. In this normal position of the operating assembly the second surface 60 thereof is engageable by a roller contact element 66 mounted on the forward end of the bumper assembly 32 in spaced relation with the contact element 54.

Each trolley is equipped with a holdback dog 68 which is pivotally carried between the body plates 24 (FIG. 5) on a pin 69. This holdback dog has a tailpiece 70 which is in overlapping abutting relationship with the body plates 24 when the dog is in normal position as shown in FIGS. 1 and 3. A pusher member 14 overtaking a trolley will first contact the holdback dog 68 and cause the holdback dog to be pivoted out of normal position allowing the pusher member 14 to pass on and into engagement with the driving face 40 of the driving dog 22 if this dog is in a driving position. The holdback dog 68 will be returned to normal position by the weight of its tailpiece 70.

An alternate construction and mounting for the driving dog is shown in FIG. 6. In this construction the driving dog 72 is pivotally mounted between the body plates 24 on a pin 73, and has a driving face 74 which, in the driving position shown, projects above the body of the trolley. The driving dog 72 also includes a counterweight portion 76 which normally urges the dog to a driving position and which acts to define this driving position through contact with a stop 77 secured across the body plates 24.

The means for actuating the driving dog 72 consists of a lever 78 pivotally mounted on a pin 79 carried by the body plates 24 and a link 80 connected between the inner end of this lever and a bracket 82 on the dog 72. A conventional type of adjustable connection generally designated 84 is employed between the link 80 and lever 78 and at least one of the body plates 24 is provided with an aperture 85 to afford access to the adjustable connection 84. Lever 78 carries a contact element 86 for engaging the operating means 58 of a preceding trolley and a preferably provided with a counterweight 88 which contributes to normally positioning the operating means and driving dog in driving position.

Operation of the trolley in a conveyor system is best explained by reference to FIG. 1. It will be assumed that the pusher members 14 of the drive line are being constantly propelled in the direction of the arrow 15. Leading trolley 20b has been stopped in some way—for example, by a track-mounted or wayside stop moving its driving dog 22 (not shown) to a non-driving position. Such a stop may be similar to an operating member 58, or may engage a driving dog 22 directly, and can be manually, or mechanically actuated to place the stop in an operative position and in a non-operative position.

Movement of the next following trolley 20a continues, through engagement of its driving dog 22a by a pusher member 14, until its contact elements 54a and 66a respectively engage the surfaces 59b and 60b of the operating means 58b of leading trolley 20b. This engagement results in a counterclockwise pivoting of the actuating member 52a as augmented by a clockwise pivoting of the operating means 58b. Driving dog 22a is moved to and held in the non-driving position shown and the trolley 20a is brought to a stop by contact between its bumper assembly 32a and the similar assembly 32b of the preceding trolley.

The next approaching trolley 20 will obviously be halted in the same way and the driving dogs 22 of all stopped trolleys will remain in a non-driving position. Pusher members 14 of the drive line will pass by all stopped trolleys, merely tripping the holdback dog 68 of each in passing.

Should there be any vertical misalignment between two adjacent trolleys 20b and 20a, or 20a and 20, which can result for example from either a vertical change in direction of the tracks 16—18, or from a trolley rearing-up on stopping, or both, this misalignment will be compensated for by the pivotal mounting of the operating means 58 which permits this member to be properly positioned vertically when engaged by the bumper-carried contact element 66 of a following trolley. This insures that a certain relative position will be established between the operating means 58 of a stopped trolley and the actuating member 52 of a following trolley so as to produce releasing movement of the following trolley driving dog 22 to non-driving position.

As soon as the driving dog 22 of the first stopped trolley 20b is returned to a driving position, trolley 20b will be picked up by the next passing pusher dog and the trolley will be moved on. When its operating means 58b is withdrawn from engagement with the contact elements 54a and 66a, the driving dog 22a will be returned to a driving position by action of the counterweight 56a of the actuating member 52a. Trolley 20a will then move on when engaged by the next pusher member 14.

While preferred embodiments have been described above in detail, it will be understood that numerous modifications might be resorted to without departing from the scope of our invention as defined in the following claims.

We claim:

1. In a conveyor installation of the type wherein a trolley equipped with a driving dog is propelled along a supporting track by driving engagement with a pusher member of a drive line, means for moving the driving dog of said trolley to a non-driving position and holding it therein when said trolley overtakes a preceding leading trolley comprising means mounting said driving dog on said first named trolley for movement between driving and non-driving positions, actuating means connected to said driving dog, said actuating means including a member movably carried by said first-named trolley and projecting forwardly therefrom in the direction of travel, operating means carried by said leading trolley and projecting rearwardly therefrom for engagement by said actuating means whereby said driving dog will be moved to and held in non-driving position in response to such engagement, and bumper means carried by at least one of said trolleys for engagement by the other, said bumper means extending parallel to the direction of travel and being arranged to prevent contact between said actuating means and the body of said leading trolley.

2. A load carrying trolley for use in a conveyor installation of the type where a plurality of such trolleys, each equipped with a driving dog, are propelled along a supporting track by driving engagement with a pusher member of a drive line, said trolley comprising a body, means mounting said driving dog on said body for movement between driving and non-driving positions, actuating means connected to said driving dog, said actuating means including a member movably carried by said body and projecting therefrom in the direction of travel of said trolley, operating means carried by said body and projecting therefrom oppositely to said actuating means whereby the driving dog of a following trolley which overtakes a preceding leading trolley will be moved to and held in a non-driving position in response to contact between the said actuating means of said following trolley and the said operating means of said leading trolley, and bumper means secured to said body parallel to the direction of travel and projecting therefrom for engagement with an overtaken trolley, said bumper means being arranged to prevent contact between the said actuating means of a following trolley and the body of a leading trolley.

3. A load carrying trolley according to claim 2 wherein said bumper means includes a contact element adapted to engage the said operating means of a leading trolley prior to contact between said bumper means and the bumper means of such leading trolley.

4. A load carrying trolley according to claim 3 wherein said operating means is pivotally secured to said body on an axis transverse to the direction of movement, said operating means including a surface engageable by the said bumper contact element to produce pivotal movement of the said operating means of a leading trolley in a direction such as to augment movement of said actuating means.

5. A load carrying trolley according to claim 2 wherein the said means mounting said driving dog on said body comprises a guideway formed in said body and extending in the general direction of movement of said driving dog between driving and non-driving positions, and means slidably and pivotally mounting said driving dog in said guideway.

6. A load carrying trolley according to claim 5 further characterized by said actuating means including an arm forming part of said driving dog, means pivotally connecting said arm to said actuating member and means pivotally connecting said actuating member to said trolley body.

7. A load carrying trolley according to claim 2 wherein the said means mounting said driving dog on said body comprises a pivot pin carried by said body and wherein said actuating means comprises a link pivotally secured to said driving dog and to said actuating member and means pivotally connecting said actuating member to said body.

8. A load carrying trolley according to claim 3 wherein said operating means is pivotally secured to said body on an axis transverse to the direction of travel, said operating means including a surface inclined downwardly in the direction of travel for engagement by said bumper contact element.

9. A load carrying trolley according to claim 2 wherein said operating means includes a surface inclined upwardly in the direction of forward travel for moving said actuating member to a position corresponding to the non-driving position of said driving dog upon engagement of said surface by said actuating member and a second surface extending from said first named surface in a direction generally parallel to the direction of travel for holding said actuating member in the non-driving position thereof.

10. A load carrying trolley for use in a conveyor installation of the type where a plurality of such trolleys, each equipped with a driving dog, are propelled along a supporting track by driving engagement with a pusher member of a drive line, said trolley comprising a body, means mounting said driving dog on said body for movement between driving and non-driving positions, driving dog actuating means including a first member movably carried by said body and a second member carried by said body, said first and second members projecting from said body in the direction of trolley travel in spaced relation to each other, means connecting said first member to said driving dog, operating means carried by said body and projecting therefrom oppositely to said actuating means, said operating means including first and second surfaces, said first surface being disposed for engagement by the said first actuating member of a following trolley to produce movement of the driving dog thereof toward non-driving position, and said second surface being disposed for engagement by the second actuating member of a following trolley to establish the relative position between said operating means and the actuating means of a following trolley.

11. A load carrying trolley according to claim 10 further characterized by means mounting said operating means on said trolley body for movement in response to the engagement of the second surface thereof by the second actuating member of a following trolley.

12. A load carrying trolley according to claim 10 further characterized by bumper means secured to said trolley body and projecting from the forward end thereof a distance sufficient to contact a preceding trolley and prevent contact between said actuating means and the body of such preceding trolley.

13. A load carrying trolley according to claim 12 wherein said second actuating member is mounted on said bumper means.

14. A load carrying trolley for use in a conveyor installation of the type where a plurality of such trolleys, each equipped with a driving dog, are propelled along a supporting track by driving engagement with a pusher member of a drive line, said trolley comprising a body, means mounting said driving dog on said body for movement between driving and non-driving positions, said driving dog having a driving face projecting above said body in the said driving position of said driving dog, an integrally formed arm extending oppositely of said driving face and roller means carried by said driving dog at a location intermediate said driving face and the end of said arm, said means mounting said driving dog on said body comprising a guideway formed on said body and engaged by the said roller means of said driving dog, an actuating member pivotally carried by said body and having one end thereof pivotally secured to said driving dog arm, the other end of said actuating member projecting beyond the forward end of said trolley body, operating means carried by said body and projecting beyond the rearward end thereof, said operating means including a first surface engageable by the said actuating member of a following trolley, said surface being disposed in a direction such as to produce pivotal movement of the said actuating member of said following trolley in the direction which results in the driving dog of a following trolley being moved from driving to a non-driving position and means normally urging said driving dog and actuating member to driving position.

15. A load carrying trolley according to claim 14 further characterized by bumper means secured to said trolley body and projecting beyond the forward end thereof, means pivotally connecting said operating means to said body, said operating means including a second surface engageable by said bumper means and disposed in a direction such as to produce pivotal movement of said operating means and increased pivotal movement of an actuating member in contact therewith toward a non-driving position.

16. A load carrying trolley according to claim 15 wherein said actuating member and said bumper means each include an element adapted to respectively contact said first and second surfaces of said operating means, said contact elements being located in adjacent spaced relation and said first and second surfaces intersecting intermediate said contact elements.

17. A load carrying trolley according to claim 16 wherein the said contact element of said actuating member projects beyond the forward end of said trolley body a distance slightly greater than the extent to which the said contact element of said bumper means similarly projects.

18. A load carrying trolley according to claim 14 further characterized by bumper means secured to said trolley and projecting beyond the forward end thereof in spaced relation to said actuating member, said operating means including a second surface inclined downwardly in the direction of travel and means carried by said bumper means for engaging said second surface.

19. A load carrying trolley according to claim 14 further characterized by bumper means secured to said trolley body and projecting beyond the forward end thereof, means pivotally connecting said operating means to said body, said operating means including a second surface inclined downwardly in the direction of travel, and means carried by said bumper means for engaging said second surface.

References Cited in the file of this patent

UNITED STATES PATENTS

| | | |
|---|---|---|
| 2,234,620 | Botley | Mar. 11, 1941 |
| 2,612,847 | Burrows | Oct. 7, 1952 |
| 2,619,370 | Leger | Nov. 25, 1952 |
| 2,619,916 | Rainier | Dec. 2, 1952 |
| 2,885,969 | Kay et al. | May 12, 1959 |

FOREIGN PATENTS

| | | |
|---|---|---|
| 180,392 | Great Britain | May 10, 1922 |